US008046537B2

(12) United States Patent
Carr et al.

(10) Patent No.: US 8,046,537 B2
(45) Date of Patent: Oct. 25, 2011

(54) VIRTUALIZATION ENGINE AND METHOD, SYSTEM, AND COMPUTER PROGRAM PRODUCT FOR MANAGING THE STORAGE OF DATA

(75) Inventors: David John Carr, Southampton (GB); Barry Douglas Whyte, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 794 days.

(21) Appl. No.: 12/014,009

(22) Filed: Jan. 14, 2008

(65) Prior Publication Data

US 2008/0168228 A1 Jul. 10, 2008

(30) Foreign Application Priority Data

Jul. 15, 2005 (GB) .................................. 0514529.7
Jul. 11, 2006 (WO) ................. PCT/EP2006/064085

(51) Int. Cl.
*G06F 13/00* (2006.01)
*G06F 13/28* (2006.01)
(52) U.S. Cl. ................. 711/117; 711/114; 711/E12.002
(58) Field of Classification Search ................... 711/117, 711/114, E12.006
See application file for complete search history.

(56) References Cited

U.S. PATENT DOCUMENTS

| | | | |
|---|---|---|---|
| 5,664,187 A * | 9/1997 | Burkes et al. ........................ | 1/1 |
| 6,032,224 A | 2/2000 | Blumenau ..................... | 711/117 |
| 7,155,593 B2 * | 12/2006 | Kano ............................. | 711/165 |
| 7,165,059 B1 * | 1/2007 | Shah et al. ............................. | 1/1 |
| 2003/0221060 A1 * | 11/2003 | Umberger et al. ............. | 711/114 |
| 2005/0154821 A1 * | 7/2005 | Furuhashi et al. ............. | 711/112 |
| 2006/0015529 A1 * | 1/2006 | Yagawa ..................... | 707/104.1 |
| 2006/0047909 A1 * | 3/2006 | Takahashi et al. ............. | 711/114 |
| 2006/0242112 A1 * | 10/2006 | Hikita ............................... | 707/1 |
| 2006/0259728 A1 * | 11/2006 | Chandrasekaran et al. .. | 711/170 |

FOREIGN PATENT DOCUMENTS

| | | |
|---|---|---|
| EP | 1521420 | 4/2005 |
| WO | WO 2007/009910 | 1/2007 |

OTHER PUBLICATIONS

International Search Report and Written Opinion from PCT Application No. PCT/EP2006/064085 mailed on Mar. 2, 2007.

(Continued)

*Primary Examiner* — Edward J Dudek, Jr.
(74) *Attorney, Agent, or Firm* — Zilka-Kotab, PC

(57) ABSTRACT

A storage management method for use in a storage area network is provided. The storage area network comprises a plurality of host data processors coupled to a virtualization engine, which is coupled to a plurality of physical storage media. Each physical storage media is assigned a tier level. The method comprises storing a threshold storage access value associated with each tier level, presenting virtual disk(s) to a host data processor and receiving I/O requests to the virtual disk from the host data processor. Additionally, metadata is stored which identifies the tier level of the physical storage to which the block corresponds, mappings between the block and blocks of a virtual disk, and an access rate to the data. The access value is periodically compared to at least one threshold rate associated with its tier level. Depending on the result, storage block(s) may be marked for migration to another tier level.

22 Claims, 3 Drawing Sheets

OTHER PUBLICATIONS

Reed et al., "Analysis of Caching Algorithms for Distributed File Systems" Operating Systems Review, ACM, New York, NY, US, vol. 30, No. 3, Jul. 1, 1996.

Anonymous, "Filesystem Integrated Tertiary Storage Management" Research Disclosure, Mason Publications, Hampshire, GB, vol. 487, No. 56, Nov. 2004.

Chinese Office Action Summary from application No. 2006800256261 mailed on Jul. 17, 2009.

Translated Chinese Office Action Summary from application No. 2006800256261 mailed on Jul. 17, 2009.

* cited by examiner

VIRTUALIZATION ENGINE AND METHOD, SYSTEM, AND COMPUTER PROGRAM PRODUCT FOR MANAGING THE STORAGE OF DATA

FIELD OF THE INVENTION

The present invention relates to the field of data processing and in particular to the management of storage and the migration of data.

BACKGROUND OF THE INVENTION

Enterprises face major storage challenges due to the fast growth of their storage needs, the increased complexity of managing the storage, and the requirement for high availability of storage. Storage Area Network (SAN) technologies enable storage systems to be engineered separately from host computers through the pooling of storage, resulting in improved efficiency.

Storage virtualization, a storage management technology which masks the physical storage complexities from the user, may also be used. Block virtualization (sometimes also called block aggregation) provides servers with a logical view of the physical storage, such as disk drives, solid-state disks, and tape drives, on which data is actually stored. The logical view may comprise a number of virtual storage areas into which the available storage space is divided (or aggregated) without regard to the physical layout of the actual storage. The servers no longer see specific physical targets, but instead see logical volumes which can be for their exclusive use. The servers send their data to the virtual storage areas as if they are directly attached thereto.

Virtualization may take place at the level of volumes, individual files or at the level of blocks that represent specific locations within a disk drive. Block aggregation can be performed within hosts (servers), in the storage network (storage routers, storage controllers), and/or in storage devices (intelligent disk arrays).

In data storage systems the problem of data currency is a general issue. It is likely that new data will be accessed regularly within the first few days or weeks of its creation, and that gradually over time the data will be accessed less and less. As an example, imagine a bank where they store data regarding share transactions. It is likely that analysis will be run on the share transactions that have happened within the last few days to spot trends. After a week this data is less important as the market will have moved on. After several weeks this data will be irrelevant. The data itself is stored so that it can be accessed by the servers performing the analysis—generally high powered servers and fast reliable storage, and may be stored as records in a database. Once the data has become less useful, there is no need to store it on the fast (expensive) storage, but it may still need to be accessed occasionally. Therefore, a system administrator will need to manually move the data from the database, either into another database, or onto cheaper storage media. Eventually the data may be moved onto tape storage for long term backup.

A method of hierarchical storage of data in a computer has been proposed in U.S. Pat. No. 6,032,224. The computer includes an interpreter and a hierarchical performance driver which monitors the rates of access of blocks of data stored on the computer's storage devices and transfers blocks of data accessed infrequently from a faster data storage device to a slower data storage device.

As the storage management is done at the host level, there is a problem when two or more different hosts, which may use different operating systems, share the same storage devices. An extra data gathering system would be required to see the access statistics of the complete system and if the hosts use different operating systems this would be have to be compatible with all the different operating systems. Alternatively, one of the hosts could be made the controller, but then this would have to be notified of the activities of all the other hosts, and again the problems of different operating systems would be present. Both of these options lead to the use of extra bandwidth, time and processor capability.

The present invention aims to address these problems.

SUMMARY OF THE INVENTION

A first aspect of the invention provides a method for managing storage of data in a network comprising a plurality of host data processors coupled to a virtualization engine, the virtualization engine being coupled to a plurality of physical storage media, each physical storage medium being assigned a tier level. The method comprises storing a threshold storage access value associated with each tier level, presenting at least one virtual disk to a host data processor and receiving I/O requests to the virtual disk from the host data processor.

Additionally metadata is stored for blocks of the physical storage. The metadata identifies mappings of the physical block to one or more corresponding block(s) of a virtual disk; an access value for each physical block representing the rate of access to the block by host data processors; and the tier level of the block. The access value of a physical block is periodically compared to the threshold access value associated with its tier level, and the block is marked for migration to another tier level in dependence on the result of the comparison.

Another method for managing storage of data in a network further comprises receiving an I/O request addressed to a block of a virtual disk, and determining the corresponding physical block of storage. This method may further comprise updating the access value associated with a physical storage block determined to correspond to a block of a virtual disk addressed in an I/O request.

The method for managing storage of data in a network can further comprise a threshold storage access value wherein the access value for a physical block comprises a check scan count and the step of periodically comparing the access value comprises updating the check scan count. This method may also comprise resetting the check scan count of a physical block in response to the receipt of an I/O request addressed to a corresponding block of a virtual disk.

The method for managing storage of data in a network may also comprise storing a break count value in the metadata for a physical block in dependence of the result of the comparison. This method may further comprise storing a break count value threshold; comparing the break count value of a physical block with the threshold break count value; and marking the block for migration if the break count value exceeds the break count threshold.

The method for managing storage of data in a network may further comprise presenting the physical storage to the virtualization engine as blocks of one or more managed disk(s), and the step of presenting a virtual disk comprises virtualizing stored data from the managed disk(s).

Virtualization engines and computer program products are also presented.

Other aspects and advantages of the present invention will become apparent from the following detailed description, which, when taken in conjunction with the drawings, illustrate by way of example the principles of the invention.

BRIEF DESCRIPTION OF THE DRAWINGS

Preferred embodiments of the present invention will now be described by way of example only, with reference to the accompanying drawings in which.

DESCRIPTION OF PARTICULAR EMBODIMENTS

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

One embodiment of the present invention proposes using a virtualization engine, which has knowledge of both the data and the location of the data, to perform data migration based on a service level agreement. Another embodiment provides a method for managing storage of data in a network comprising a plurality of host data processors coupled to a virtualization engine, the virtualization engine being coupled to a plurality of physical storage media, each physical storage medium being assigned a tier level. The method comprises storing a threshold storage access value associated with each tier level, presenting at least one virtual disk to a host data processor and receiving I/O requests to the virtual disk from the host data processor.

Figure 1:
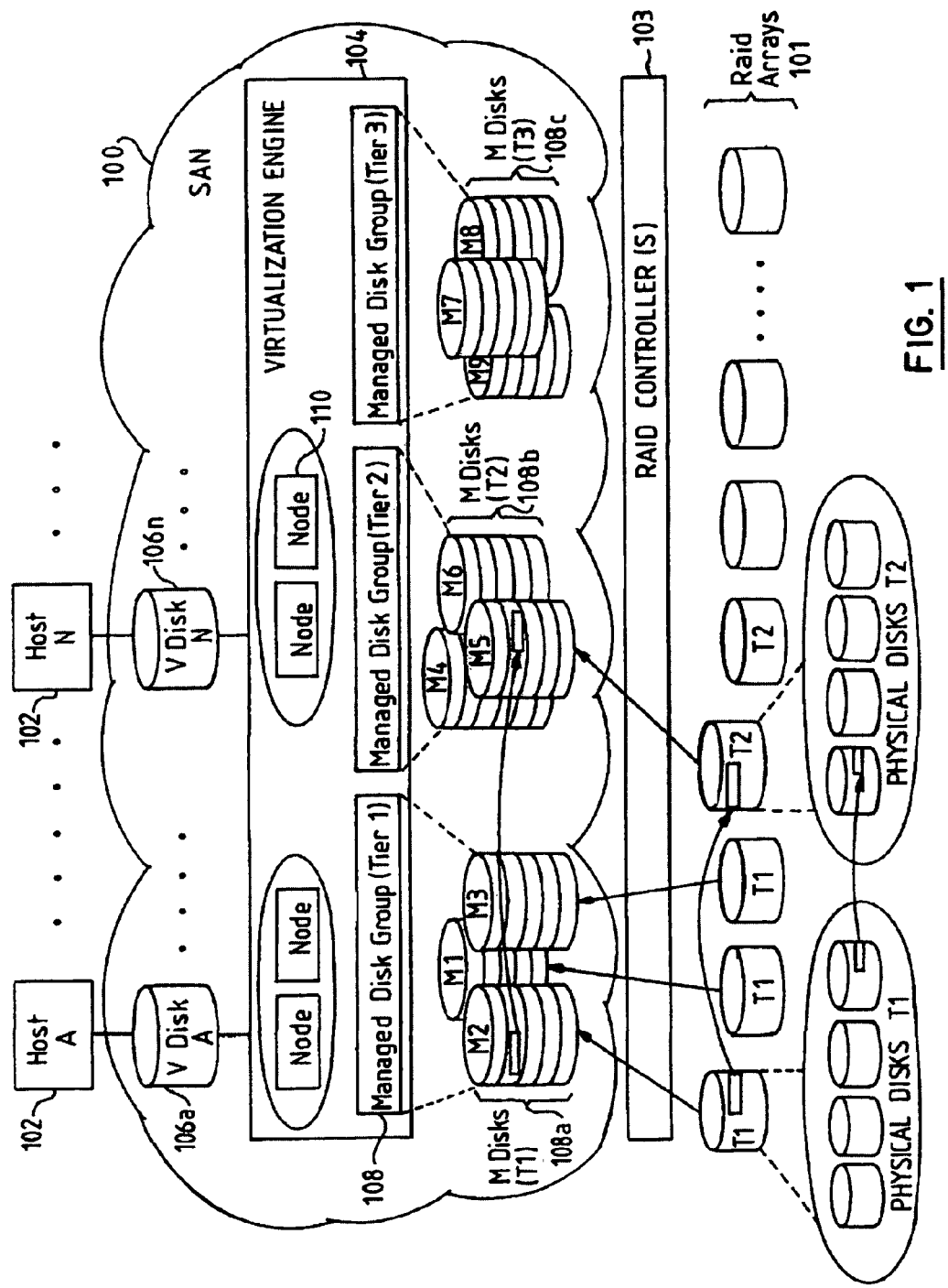
FIG. 1 shows an example of a Storage Area Network in which the present invention may be implemented.

Referring to FIG. 1, there is shown a storage area network (SAN) 100 which has several host application servers 102 attached. These can be many different types, typically some number of enterprise servers, and some number of user workstations.

Also attached to the SAN 100 (via Redundant Array of Inexpensive Disks (RAID) controllers A, B and C, are various levels of physical storage. In the present example, there are three levels: Tier 1, which may be, for example, enterprise level storage, such as the IBM® Enterprise Storage Server® (ESS); Tier 2, which may be mid-range storage, such as the IBM Fibre Array Storage Technology™ (FAStT); and Tier 3, which may be lower-end storage, such as the IBM FAStT Serial Advanced Technology Attachment (SATA).

Typically, each Managed Disk (Mdisk) corresponds to a single tier and each RAID array 101 belongs to a single tier. Each of the RAID controllers 103 may control RAID arrays 101 belonging to different tiers. In addition to different tiers being applied to different physical disk types, as mentioned above, different tiers may also be applied to different RAID types; for example, a RAID-5 array may be placed in a higher tier than a RAID-0 array.

The SAN 100 is virtualized by means of a virtualization engine 104 which sits in the data path for all SAN data, and presents Virtual Disks 106a ... 106n to the host data servers and workstations 102. These virtual disks 106a ... 106n are made up from the capacity provided across the three tiers of storage devices.

The virtualization engine 104 comprises one or more nodes 110 (four shown), which provide virtualization, cache and copy services to the hosts. Typically, the nodes 110 are deployed in pairs and make up a cluster of nodes, with each pair of nodes known as an Input/Output (I/O) group.

As storage is attached to the SAN 100 it is added to various pools of storage each controlled by a RAID controller 103. Each RAID controller 103 presents an SCSI (Small Computer System Interface) disk to the virtualization engine 104. The presented disk may be managed by the virtualization engine 104, and be called a managed disk, or MDisk 108a ... 108c. These MDisks 108a ... 108c are split into extents, fixed size blocks of usable capacity, which are numbered sequentially from the start to the end of each MDisk 108a ... 108c. These extents can then be concatenated, striped, or any desirable algorithm can be used to produce larger virtual disks (VDisks) 106a ... 106n which are presented to the hosts by the nodes 110.

The MDisks M1, M2, ... M9 can be grouped together in Managed Disk Groups or MDGs 108, typically characterised by factors such as performance, RAID level, reliability, vendor, and so on. According to the preferred embodiment, all MDisks 108a ... 108c in an MDG 108 represent storage of the same tier level, as shown in FIG. 1.

The virtualization engine 104 acts as a shared storage interconnect coupled to the host data processors and also coupled to a plurality of physical storage media, and enables the host data processors to be maintained 'zoned' from the physical storage media. The physical storage media are invisible to the host data processors, which see only the virtual disks 106a ... 106n presented by the virtualization engine 104.

I/O requests from the host data processors to the virtual disks 106a ... 106n are directed by the virtualization engine 104 to the corresponding physical data blocks according to its mappings. At the same time the virtualization engine 104 maintains an access value for each physical block which it updates according to the I/O requests it receives.

The virtualization engine 104 splits the physical storage into chunks, or 'extents'. Metadata within the virtualization engine 104 tracks the mapping of extents to virtual disks 106a ... 106n. Additionally, each extent is tagged with metadata denoting the tier of physical storage on which the data of the extent resides. Typically, a high tier means the data is frequently used and needs to be on the expensive storage; and a low tier means the data has not been accessed for some time and is ripe for backup to tape.

In one embodiment of the invention, the access value for a physical block is periodically compared to the threshold rate associated with its tier level, and, depending on the result of the comparison, a storage block may then be marked for migration of its data to a storage medium of another tier level.

The host data processors may be those of different vendors and may have different operating systems, and there is no need for the hosts to notify each other of their I/O requests.

Figure 2:
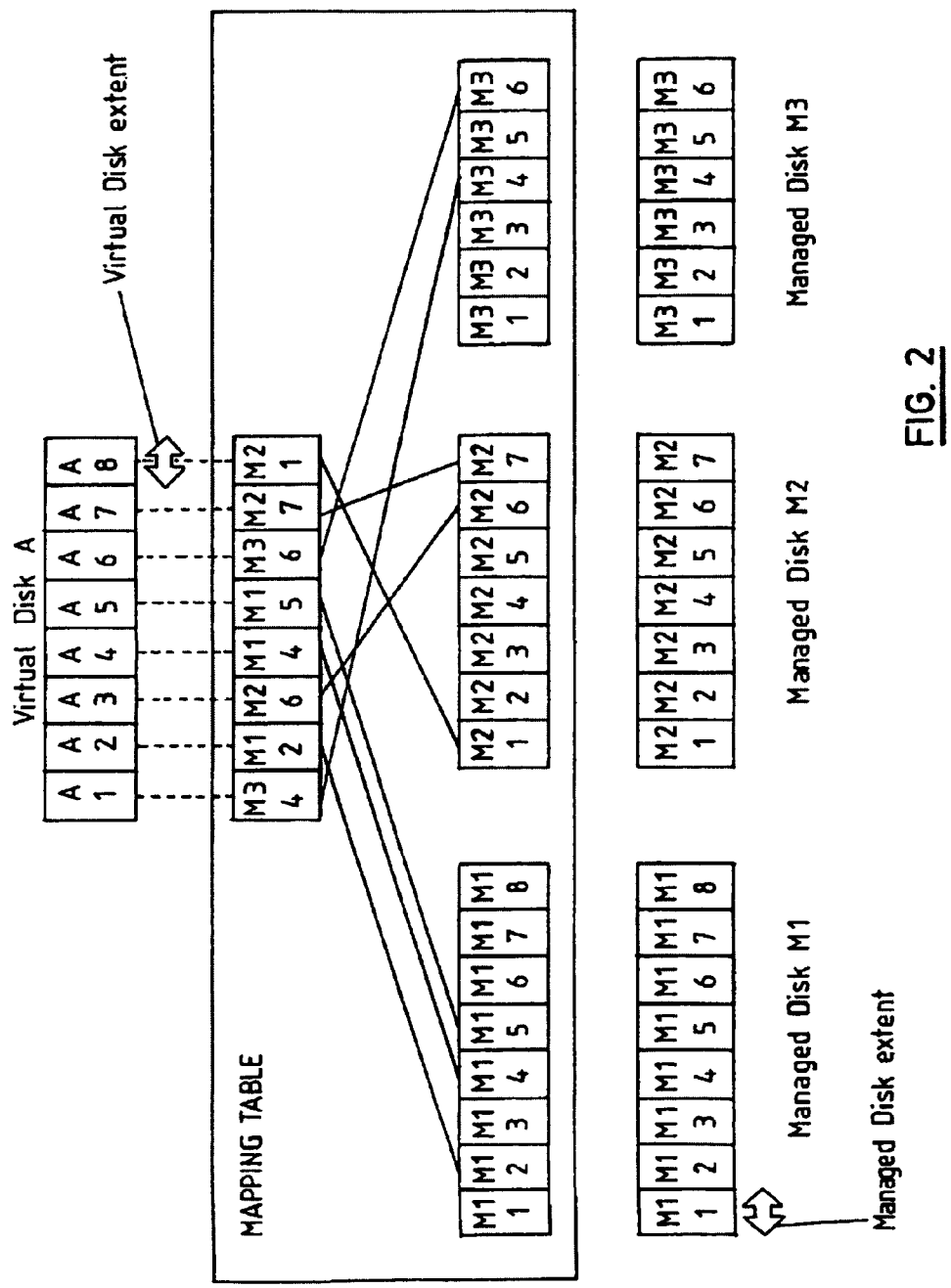
FIG. 2 shows a simple view of block virtualization.

The virtualization engine 104 converts Logical Block Addresses (LBAs) of a virtual disk to extents of the VDisk, and maps extents of the VDisk to MDisk extents. An example of the mapping from a VDisk to MDisks is shown in FIG. 2. Each of the extents of the VDisk A, are mapped to an extent of one of the managed disks M1, M2 or M3. The mapping table, which can be created from metadata stored by each node, shows that some of the managed disk extents are unused. These unused extents are available for use in creating new VDisks, migration, expansion, and so on.

Typically, virtual disks 106a ... 106n are created and distributed so that the enterprise level servers use enterprise level storage, and so on. However, as described herein extents which have not been accessed for some time can be migrated to a different level of storage.

To accomplish this, in addition to the metadata used to track the mapping of managed disk extents to virtual disks 106a ... 106n, each extent is also tagged with metadata denoting the 'tier' of storage (T1 ... T3) to which the data on the extent belongs. The access rate to each extent is monitored and compared to a storage migration policy, or Service Level Agreement (SLA), which specifies the conditions under which data should be migrated to storage of a different tier. As the data is read and written to any given extent, the SLA is used to validate the tier that the extent is marked with and either leave the extent marked with its current tier, or move the extent up or down in the tiered system. The storage management system thus automatically moves data between the tiers, freeing up capacity in the high end storage and eventually backing up the data to tape and freeing up the high level storage altogether. Attributes of the Service Level Agreement can be defined by a system administrator.

Figure 3:
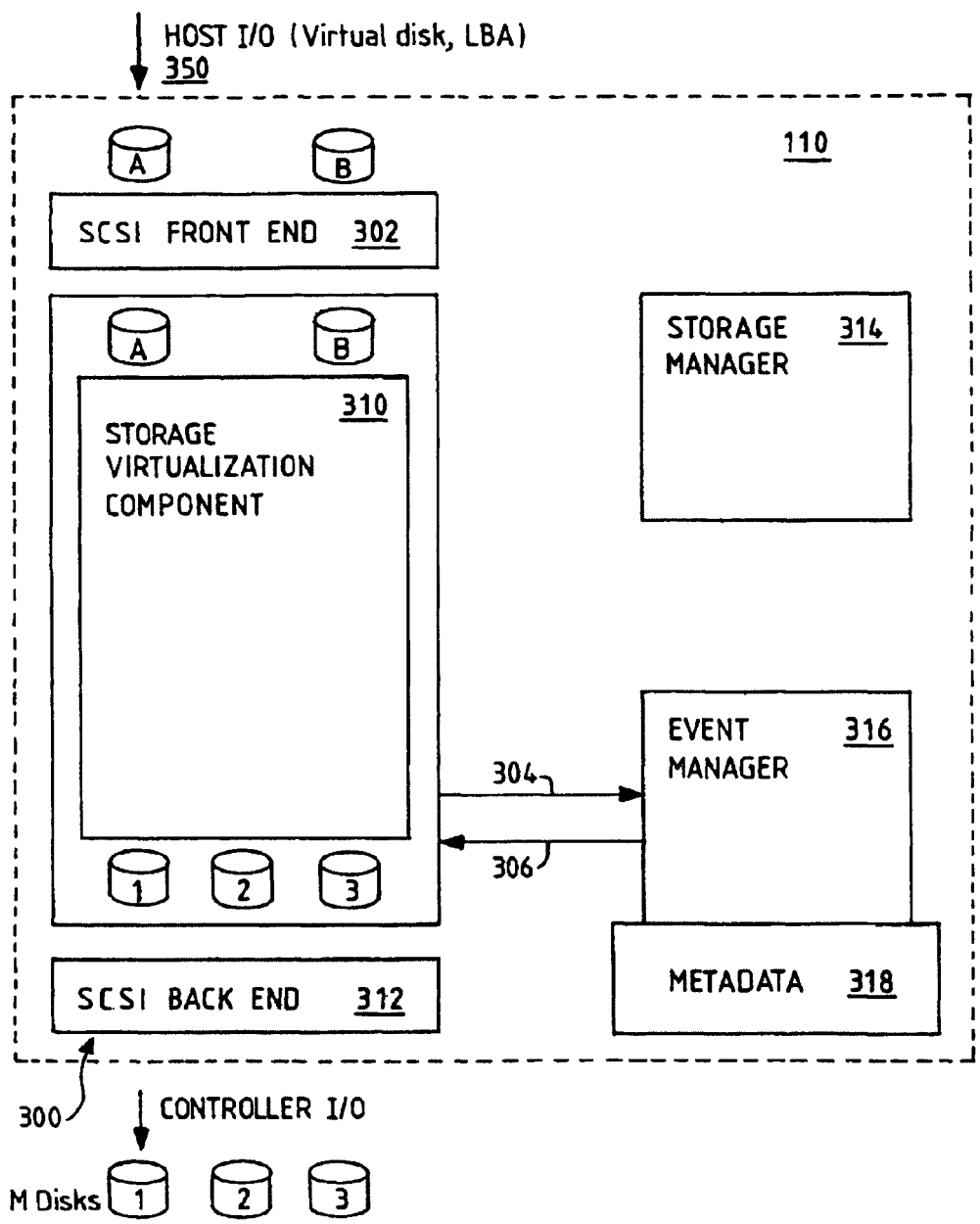
FIG. 3 shows components of a virtualization engine according to an embodiment of the invention.

An I/O flow can be described with reference to FIG. 3. As shown in FIG. 3, a virtualization engine or node 110 comprises the following modules: SCSI Front End 302, Storage Virtualization Component 310, SCSI Back End 312, Storage Manager 314 and Event Manager 316.

The SCSI Front End 302 receives I/O requests from hosts (which have no need to notify each other of their requests); conducts LUN mapping (i.e. between LBAs to Logical Unit Numbers (LUNs) (or extents) of virtual disks A and C); and converts SCSI Read and Write commands into the node's internal format.

The storage virtualization component 310 is responsible for mapping between Virtual Disks A and B and Managed Disks 1, 2, and 3 and for performing data migration.

The SCSI Back End processes requests to Mdisks which are sent to it by the storage virtualization component 310, and addresses commands to the RAID controllers.

The I/O stack may also include other modules (not shown), such as Remote Copy, Flash Copy, Cache, etc.

The virtualization engine or node displayed in FIG. 3 belongs to an I/O group to which Virtual Disks A and B are assigned. This means that this node presents an interface to Virtual Disks A and B for hosts. Managed disks 1, 2, and 3 may also correspond to other virtual disks assigned to other nodes.

The event manager 316 manages metadata 318, which comprises mapping information for each managed extent as well as tier level data and an access value for the extent. This metadata 318 is also available to the storage virtualization component 310 and storage manager 314.

Now consider the receipt from a host of a write request 350 which includes the ID of the virtual disk to which the request refers, and the LBA to which the write should be made. On receipt of the write request, the SCSI Front End 302 converts the specified LBA into an extent ID (LUN) of a virtual disk, let us say this is extent 3 of VDisk A (A,3). The storage virtualization component 310 uses the metadata 318, shown in the form of a mapping table in FIG. 2, to map extent A,3 to extent 6 of MDisk 2 (M2, 6). The write request is then passed via the SCSI back end 312 to the relevant disk controller for MDisk 2, and Data is written to extent M2,6. The storage virtualization component 310 sends a message 304 to the event manager 316 indicating that a write to extent 6 of MDisk 2 has been requested. The event manager 316 then updates the metadata 318 in respect of extent M2,6 to indicate that this extent is now full. The event manager 316 also updates the access value in the metadata 318 for the extent. This may be by storing the time at which the write occurred as the access value, or by resetting a count value in the metadata 318 which is monitored by the storage manager 314 as will be described later. The event manager 316 returns a message 306 to the storage virtualization component 310 to indicate that the metadata 318 has been updated to reflect the write operation.

The storage manager 314 monitors the use of physical extents and decides whether to migrate the data on an extent from its current tier to another, in accordance with its SLA. The storage manager 314 may use many different factors to determine the access value of a particular extent such as date last accessed; number of times accessed during a recent time period; the type of recent accesses (e.g. read or write), etc. It uses the metadata 318 to ascertain such details. The system administrator can set up the classification of "recent" when the node is set up.

The migration of data by the storage manager 314 according to a preferred embodiment will now be described in further detail. The storage manager 314 scans the metadata 318 at regular intervals, such as every other day, according to its SLA, to check that the tier level of each extent is within the SLA.

This check may comprise reviewing a count value, in the metadata 318 associated with each managed extent. This count value may indicate the number of check scans which have occurred since the extent was last accessed. In this example, the event manager 316 is configured to reset the count value when a managed extent is accessed, for example for a read or write operation. The Service Level Agreement may specify one or more thresholds, for each tier of storage, to which the count value is compared. For example, for a tier 1 extent a single 'demote' threshold of a count value of five may be set, such that if the count value for any extent equals or exceeds five, i.e. accessed infrequently for its tier, then the extent is 'demoted' through migration to a lower tier storage extent. Some tiers may have more than one threshold to which the count value for an extent is compared to determine whether the data on the extent should be moved up or down a tier or whether it should stay in its current tier. If the count value for an extent is found to be below a 'promote' threshold for its tier, the storage manager 314 will mark the extent for 'promotion', i.e. migration to a higher tier.

In a modification of the preferred embodiment, the count value of an extent may indicate the number of times that the extent has been accessed, for example the count value may be incremented or decremented each time the extent is accessed, rather than being reset to a particular value. The threshold access values would be modified accordingly.

The storage manager 314 then marks the extent for migration and adds its name and current location, along with an indication of the tier to which the data on the extent is to be migrated, to a data migration queue. This data migration queue may be set up to carry out tier change migrations only; or may be a general data migration queue; and typically carries out tier change migrations during background processing.

During migration, I/O on the source extent of the MDisk on all nodes are paused; the node performing the migration selects a target extent on a disk of the correct tier and then selects a chunk of the source extent. Using the RAID controllers 103, the node 110 synchronously reads the chunk of data from the source extent and writes the chunk of data to the target extent on the target disk. Once the entire chunk has been copied this process is repeated for the next chunk of the extent. Once the entire extent has been migrated, the event manager 316 is notified that the move has been successful and the metadata 318 for the virtual disk mapping is updated to indicate the new location of the data on a different managed disk, such as M5 which corresponds to the target disk to which the data has been moved.

The Service Level algorithm could be modified in various ways, for example, adding 'break' counts to an extent each time the extent is found to be breaking the SLA for that tier, such as over/below a particular threshold, and only starting data migration once a count of three has been reached, for example. This would stop the unnecessary migration of data when the system is generally using the data, but has had a small period of time where things were quiescing.

The algorithm preferably takes into account the general usage of the system. For example, if the entire system has been guiesced, the I/O rates will be very low, or zero, and the system should suspend the process that validates the tier levels of extents of data. Otherwise, all data in the system would be migrated down though the tiers of storage because the system is under no load.

The SLA set by the user needs to be granular enough so that the user can fine tune this auto-migration. However, it should also be terse enough so that data is not needlessly bounced back and forward through the tiers. Preferably, the period of time involved without data access or update before migration downwards is effected is a matter of days, and several accesses per day occur before migration upwards is performed.

The use of a data migration queue ensures that the system does not become overloaded performing tier-based data migrations at the expense of user (normal) I/O operations. This could also be customizable by the user in a system-wide SLA.

In another modification, when an extent is found to fall outside the usage range required by the SLA for its tier, data for the whole VDisk to which the extent maps is migrated, rather than just the data on the extent. This would enable all extents of a VDisk to move together to a different Managed Disk Group, and would avoid having extents associated with different MDGs. Alternatively, a whole VDisk may be selected for migration when a certain number or percentage of its extents is found to have an access rate which is outside the SLA for its tier.

It will be clear to one skilled in the art that the method of the present invention may suitably be embodied in a logic apparatus comprising logic means to perform the steps of the method, and that such logic means may comprise hardware components or firmware components.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Accordingly, the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Suitably, the computer program is stored on a carrier medium in machine or device readable form, for example in solid-state memory, magnetic memory such as disc or tape, optically or magneto-optically readable memory such as compact disk (CD) or Digital Versatile Disk (DVD) etc, and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the preceding example embodiments, the invention is not limited thereto and that there are many possible variations and modifications which fall within the scope of the invention.

The scope of the present disclosure includes any novel feature or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt, the term "comprising", as used herein throughout the description and claims is not to be construed as meaning "consisting only of".

The invention claimed is:

1. A method for managing storage of data in a network comprising a plurality of host data processors coupled to a virtualization engine, the virtualization engine being coupled to a plurality of physical storage media, each physical storage medium being assigned a tier level, the method comprising:
storing a threshold storage access value associated with each tier level;
presenting at least one virtual disk to a host data processor;
receiving I/O requests to the virtual disk from the host data processor;
storing metadata for blocks of the physical storage, the metadata identifying:
mappings of the physical block to one or more corresponding block(s) of a virtual disk; and
an access value for each physical block representing the rate of access to the block by host data processors; and the tier level of the block; and
periodically comparing the access value of a physical block to the threshold access value associated with its tier level,
marking the block for migration to another tier level in dependence on the result of the comparison; and
further comprising storing a break count value in the metadata for a physical block in dependence of the result of the comparison.

2. A method according to claim 1, further comprising receiving an I/O request addressed to a block of a virtual disk, and determining the corresponding physical block of storage.

3. A method according to claim 2, further comprising updating the access value associated with a physical storage block determined to correspond to a block of a virtual disk addressed in an I/O request.

4. A method according to claim 1, wherein the access value for a physical block comprises a check scan count and the step of periodically comparing the access value comprises updating the check scan count.

5. A method according to claim 4, comprising resetting the check scan count of a physical block in response to the receipt of an I/O request addressed to a corresponding block of a virtual disk.

6. A method according to claim 1, further comprising storing a break count value threshold; comparing the break count value of a physical block with the threshold break count value; and marking the block for migration if the break count value exceeds the break count threshold.

7. A method according to claim 1, further comprising presenting the physical storage to the virtualization engine as blocks of one or more managed disk(s), and said step of presenting a virtual disk comprises virtualizing stored data from said managed disk(s).

8. A virtualization engine for use in a network comprising a plurality of host data processors operable to communicate with the virtualization engine; the virtualization engine operable to:
communicate with a plurality of physical storage media, each physical storage medium being assigned a tier level; and
present at least one virtual disk to a host data processor and receive I/O requests to the virtual disk from the host data processor; and the virtualization engine comprising:
data identifying a threshold storage access value associated with each tier level;
metadata for blocks of the physical storage identifying:
mappings between blocks of physical storage to corresponding blocks of virtual disks;
an access value for each physical block representing the rate of access to the block by host data processors; and the tier level of the block; and
a storage manager for periodically comparing the access value of a physical block to the threshold access value associated with its tier level, and marking the block for migration to another tier level in dependence on the result of the comparison;
the virtualization engine being further operable to store a break count value in the metadata for a physical block in dependence of the result of the periodic comparison.

9. A virtualization engine according to claim 8, operable to receive an I/O request addressed to a block of a virtual disk, and determine the corresponding physical block of storage.

10. A virtualization engine according to claim 9, further comprising an event manager for updating the access value associated with a physical storage block determined to correspond to a block of a virtual disk addressed in an I/O request.

11. A virtualization engine according to claim 8, wherein the access value for a physical block comprises a check scan count which the storage manager is operable to update the check scan count each time a periodic comparison is carried out.

12. A virtualization engine according to claim 11, wherein the metadata comprises event manager is operable to reset the check scan count of a physical block in response to the receipt of an I/O request addressed to a corresponding block of a virtual disk.

13. A virtualization engine according to claim 8, comprising data identifying a break count value threshold; and operable to compare the break count value of a physical block with the threshold break count value, and mark the block for migration if the break count value exceeds the break count threshold.

14. A virtualization engine according to claim 8, coupled to physical storage media presented to the virtualization engine as blocks of one or more managed disk(s), the virtualization engine operable to virtualize stored data from said managed disk(s) into a virtual disk for presentation to the host data processor.

15. A system for managing storage of data, the system comprising a plurality of host data processors coupled to a virtualization engine, the virtualization engine being coupled to a plurality of physical storage media, each physical storage medium being assigned a tier level;
the virtualization engine operable to:
communicate with a plurality of physical storage media, each physical storage medium being assigned a tier level; and
present at least one virtual disk to a host data processor and receive I/O requests to the virtual disk from the host data processor; and the virtualization engine comprising:
data identifying a threshold storage access value associated with each tier level;
metadata for blocks of the physical storage identifying:
mappings between blocks of physical storage to corresponding blocks of virtual disks;
an access value for each physical block representing the rate of access to the block by host data processors; and the tier level of the block; and
a storage manager for periodically comparing the access value of a physical block to the threshold access value associated with its tier level, and marking the block for migration to another tier level in dependence on the result of the comparison;

further comprising one or more storage controller(s) which presents data stored on the physical storage media to the virtualization engine as a plurality of managed disks, the virtualization engine being further operable to store a break count value in the metadata for a physical block in dependence of the result of the periodic comparison.

16. A computer program product comprising a computer useable medium having a computer readable program stored thereon in a non-volatile manner, wherein the computer readable program when executed on a computer causes the computer to:
 store a threshold storage access value associated with each tier level;
 present at least one virtual disk to a host data processor;
 receiving I/O requests to the virtual disk from the host data processor;
 store metadata for blocks of the physical storage, the metadata identifying:
  mappings of the physical block to one or more corresponding block(s) of a virtual disk; and
  an access value for each physical block representing the rate of access to the block by host data processors; and the tier level of the block;
 periodically compare the access value of a physical block to the threshold access value associated with its tier level, and marking the block for migration to another tier level in dependence on the result of the comparison; and
 store a break count value in the metadata for a physical block in dependence of the result of the comparison.

17. A computer program product according to claim 16, further comprising receiving an I/O request addressed to a block of a virtual disk, and determining the corresponding physical block of storage.

18. A computer program product according to claim 17, further comprising updating the access value associated with a physical storage block determined to correspond to a block of a virtual disk addressed in an I/O request.

19. A computer program product according to claim 16, wherein the access value for a physical block comprises a check scan count and the step of periodically comparing the access value comprises updating the check scan count.

20. A computer program product according to claim 19, comprising resetting the check scan count of a physical block in response to the receipt of an I/O request addressed to a corresponding block of a virtual disk.

21. A computer program product according to claim 16, further comprising storing a break count value threshold; comparing the break count value of a physical block with the threshold break count value; and marking the block for migration if the break count value exceeds the break count threshold.

22. A computer program product according to claim 16, further comprising presenting the physical storage to the virtualization engine as blocks of one or more managed disk(s), and said step of presenting a virtual disk comprises virtualizing stored data from said managed disk(s).

* * * * *